Figure 9:
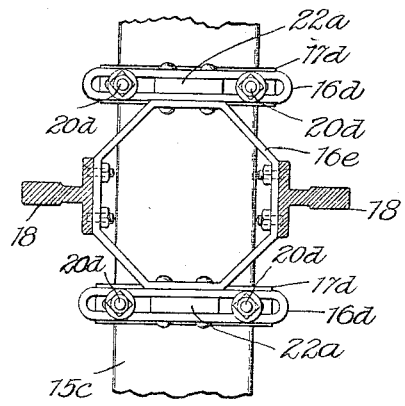

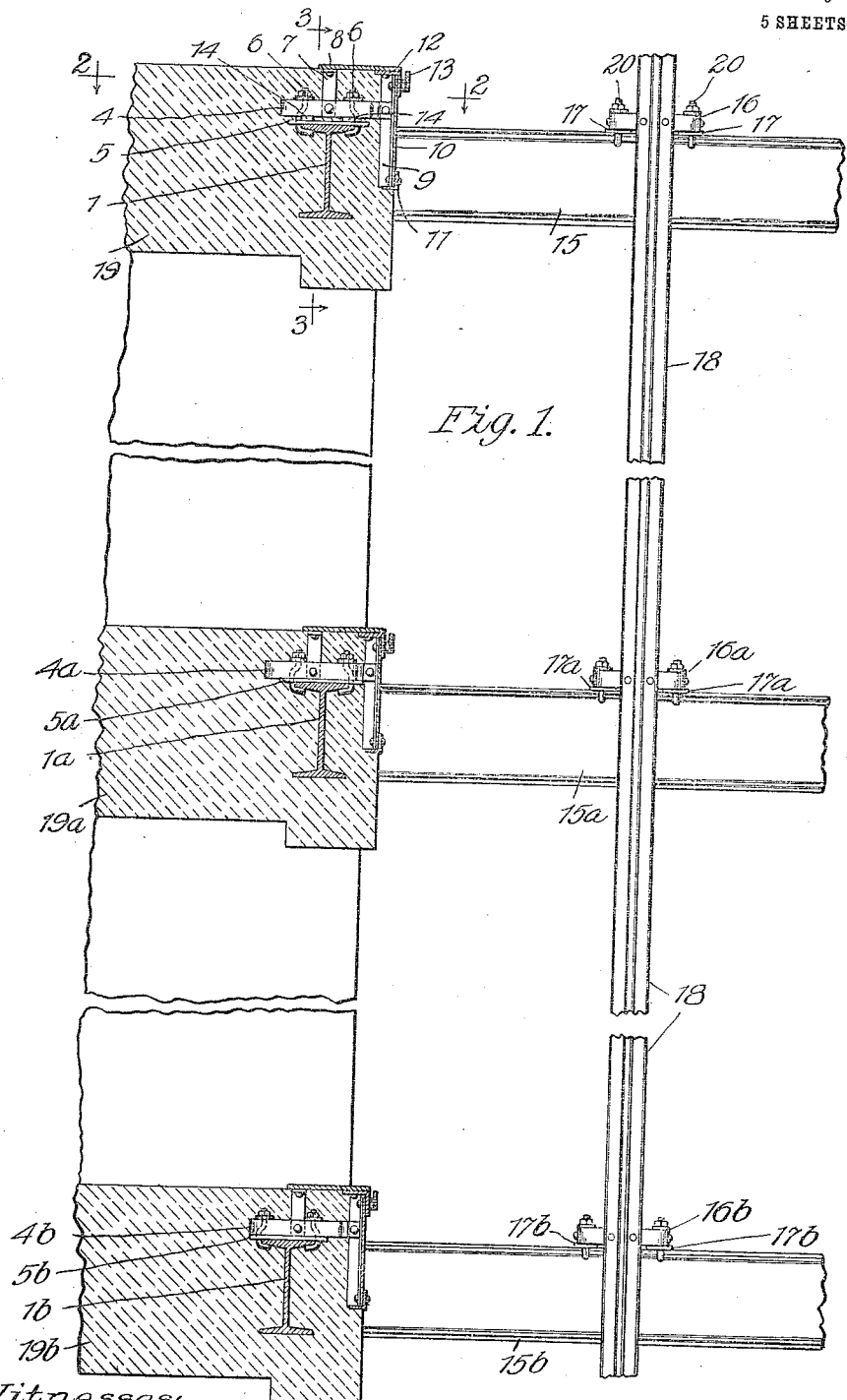

F. A. WINSLOW.
BRACKET FOR STRUCTURAL WORK.
APPLICATION FILED APR. 24, 1908.
957,531.
Patented May 10, 1910.
5 SHEETS—SHEET 2.
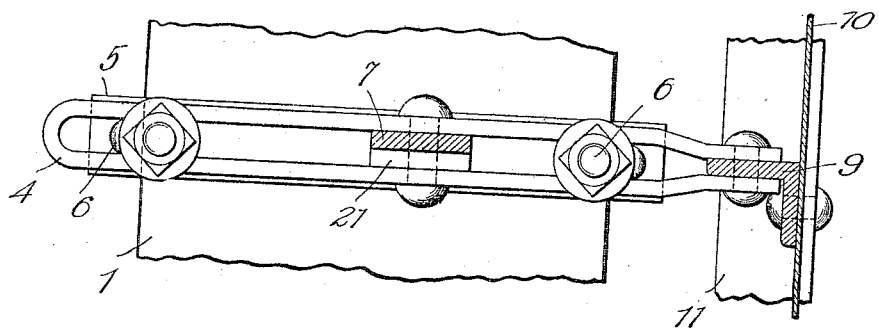
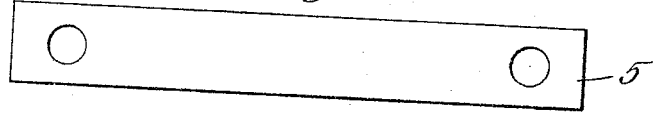
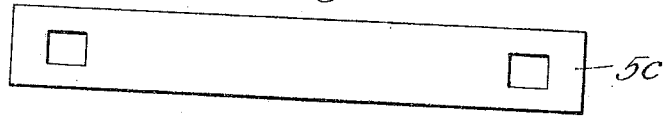
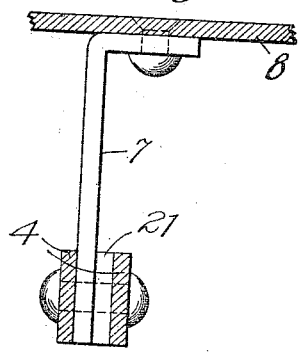
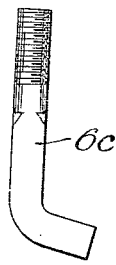

F. A. WINSLOW.
BRACKET FOR STRUCTURAL WORK.
APPLICATION FILED APR. 24, 1908.
957,531.
Patented May 10, 1910.
5 SHEETS—SHEET 3.
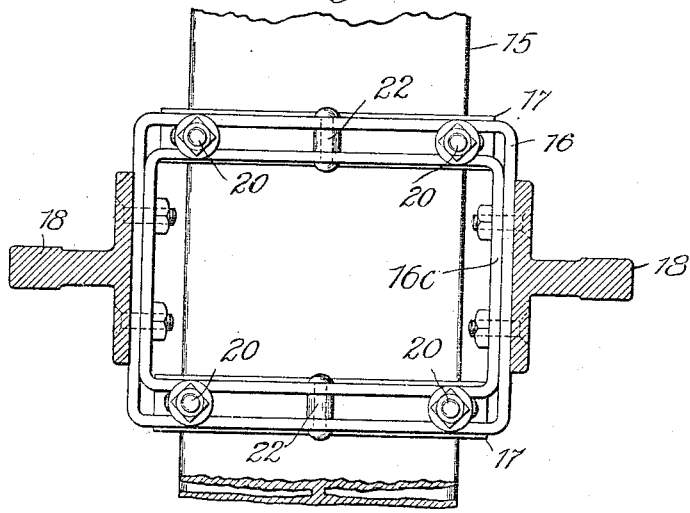
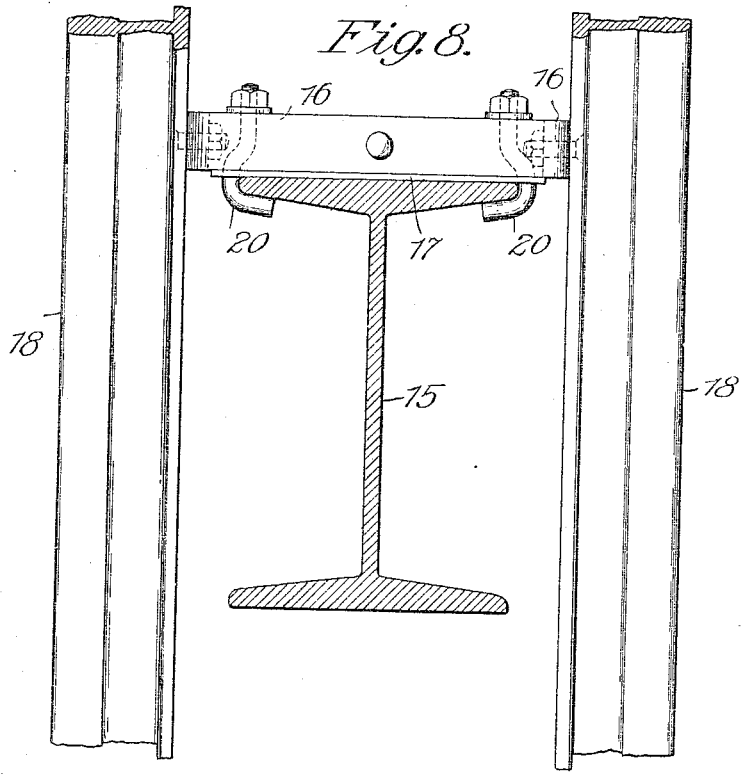
Witnesses:
Leonard W. Novander
George E. Higham
Inventor
Francis A. Winslow
By Brown & Williams
Attorneys

F. A. WINSLOW.
BRACKET FOR STRUCTURAL WORK.
APPLICATION FILED APR. 24, 1908.

957,531.

Patented May 10, 1910.

5 SHEETS—SHEET 4.

Witnesses:
Leonard W. Novander.
George C. Higham.

Inventor
Francis A. Winslow
By Brown & Williams
Attorneys

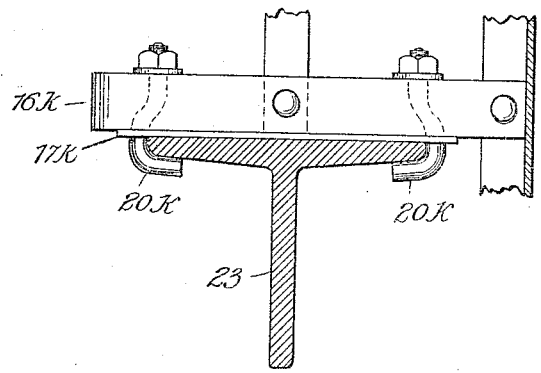
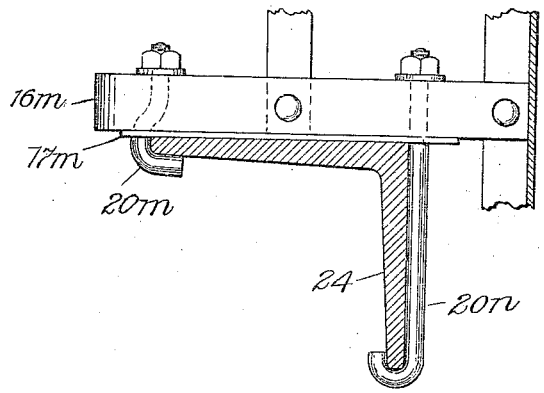

UNITED STATES PATENT OFFICE.

FRANCIS A. WINSLOW, OF CHICAGO, ILLINOIS, ASSIGNOR TO THE WINSLOW BROS. COMPANY, OF CHICAGO, ILLINOIS, A CORPORATION.

BRACKET FOR STRUCTURAL WORK.

957,531.     Specification of Letters Patent.     Patented May 10, 1910.

Application filed April 24, 1908. Serial No. 428,969.

*To all whom it may concern:*

Be it known that I, FRANCIS A. WINSLOW, a citizen of the United States, residing at Chicago, in the county of Cook and State of Illinois, have invented a certain new and Improved Bracket for Structural Work, (Case 5,) of which the following is a full, clear, concise, and exact description, reference being had to the accompanying drawings, forming a part of this specification.

My invention relates to an improved means for supporting work from metal beams and consists essentially in a bracket and connecting means by which the bracket may be adjustably supported from metal beams of well known cross-section, as I beams, T beams, angle bars, etc.

In the construction of modern buildings it often occurs that the beams used in forming the framework of the building, while they are designed to, and should, occupy similar positions relatively to horizontal and vertical planes, in actual construction do not, and as a result it is necessary in many cases to support work, as, for instance, the metal work of elevator wells, stairway openings, etc., that must be exact, by means of brackets of varying dimensions. On account of not being able to determine beforehand just how much out of true the supporting framework might be, this has necessitated a considerable amount of labor in the past in drilling the brackets to fit the beams during the process of erection of the elevator well facia or stair area facia, as the case might be or in similar work, and it is an object of my invention to obviate this disadvantage by means of an adjustable bracket and special means independent of the bracket for retaining in operative position the clamps used, during the adjustment of the brackets.

My invention is particularly applicable to supporting the guideways for elevators, or, in fact, for any purpose in which plates or bars or material of any description must be assembled in vertical, horizontal or other planes, regardless of the accuracy of assembling of the structural framework of the building.

Figure 10:
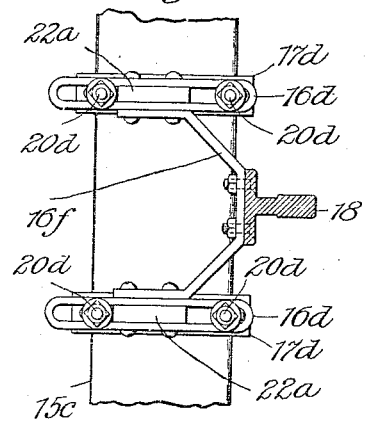
Figure 11:
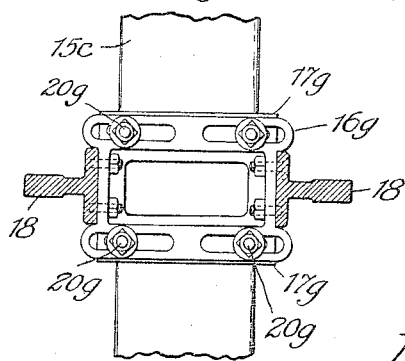
Figure 12:
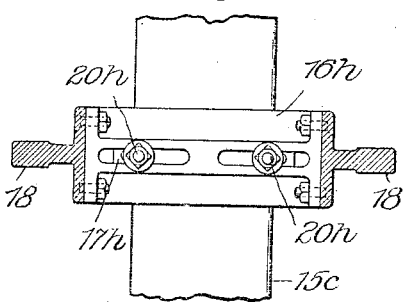
Figure 13:
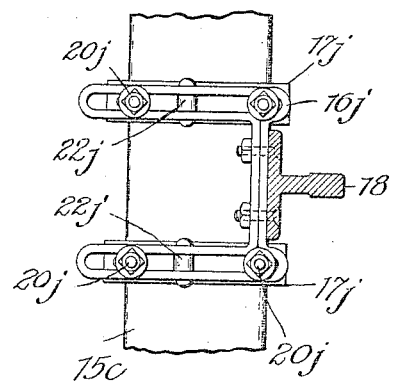

The several drawings illustrating my invention are as follows:

Figure 1 is a view partially in section of an elevator well showing my invention as adapted for supporting the facia and the elevator guideways in the well; Fig. 2 is a top view of one of the brackets used to support the facia as taken along the dotted line 2—2 in Fig. 1; Fig. 3 is a view of the means used for supporting the threshold plate from the bracket and is taken along the dotted line 3—3 in Fig. 1; Fig. 4 is a view of a retainer bar used in connection with the bracket; Figs. 5 and 6 are detail views of a modified form of clamping bolt and retainer bar; Fig. 7 is a top view of a bracket used for supporting the elevator guideways as shown in Fig. 1; Fig. 8 is a side view of the parts shown in Fig. 7; Fig. 9 is a view similar to Fig. 7 of a modified form of bracket for accomplishing the same result; Fig. 10 shows in a view similar to Fig. 9 a similar bracket adapted for supporting a single elevator guideway; Figs. 11 and 12 show in top view two forms of bracket made of castings rather than of wrought metal as are the brackets shown in Figs. 1 to 10, inclusive; Fig. 13 shows in top view a bracket similar to that shown in Fig. 7, but modified to support a single elevator guideway; Fig. 14 shows a bracket similar to that shown in Fig. 2 as secured to a T beam; and Fig. 15 shows a similar bracket secured to an angle bar.

Referring to Fig. 1, the I beams 1, 1ª, 1ᵇ are located parallel with the front edge of the elevator well and are designed to support the floor and elevator casing along this edge, as well as the I beams, 15, 15ª and 15ᵇ respectively extending transversely of the elevator well for the purpose of supporting the elevator guideways 18. The I beam 1 has secured to its upper flange by clamp bolts 6, 6 a bracket 4 formed from wrought bar iron preferably in the shape shown in Fig. 2 and secured at its outer end to a short angle bar 9. This angle bar is fastened to a plate 10 along the lower edge of which is secured an angle bar 11. The plate 10 has secured along its upper edge an angle bar 12 and also a bar 13 spaced from the angle bar 12 by suitable separators as indicated. The bar 13 and angle bar 12 together form a guideway for the elevator door. The angle bar 12 supports one edge of the threshold plate 8, the other edge of which is supported by bent bars 7 occurring at intervals, the lower ends of these bent bars being secured to the brackets 4. Since these bars 7 are usually thinner than the openings in the bracket 4, fillers, as 21, are used to make up the difference in thickness. The clamp bolts 6 are bent as indicated, as a result of which the lower ends engage the under surface of the upper flange of the I beam 1 and the upper bends in the bolts serve to prevent their turning in the bracket 4. These bolts pass through circular openings slightly larger than the bolts in the retainer plate 5, such retainer plate being so made that the openings hold the bolts in engaging position with the upper flange of the I beam 1. The bolts 6 may be inserted through the top of the bracket 4 by removing the nuts and also through the retainer bar 5, and when in position the washers are put in place, and for this condition before the nuts are tightened from the construction above described it is apparent that the bracket 4 and parts carried thereby may be moved horizontally to bring the plate 10 to a desired line, and since a number of these brackets 4 are used at intervals along the plate 10, means are provided by which the plate 10 and threshold plate 8 may be securely supported and yet readily adjusted horizontally. It often occurs that I beams are lower than called for in the drawings, and in this case blocks 14 of the right thickness are inserted between the bracket 4 and the retainer bar 5, as a result of which the bracket 4 is brought to the proper level and hence the threshold plate 8 is properly leveled without changing the proper clamping engagement of the bolts 6, 6.

In Fig. 1 portions of three floors are shown, the I beam 1 of the upper floor being shown in the proper position horizontally but too low vertically, while the I beams $1^a$ and $1^b$ for the two other floors are shown in proper position vertically but too far to the right and too far to the left respectively in a horizontal direction.

In the modification shown in Figs. 5 and 6, in which clamping bolts $6^c$ made of square stock are used, corresponding openings are made in the retaining bar $5^c$ and in this case the engagement of the openings in the retaining bar by the square portions of the bolts prevents their turning when the nuts are drawn up. The brackets shown for supporting the elevator guideways 18 from the I beams 15, $15^a$ and $15^b$ are formed as indicated in Fig. 7 and consist in two welded bands of wrought material, an outer one 16 and an inner one $16^c$, and riveted together as indicated through separators 22, which separators and bands are so designed as to leave openings between the bands just sufficient for the clamping bolts 20 to pass therethrough. Retaining bars 17 similar to retaining bar 5 are used to maintain the proper clamping engagement of the bolts 20 with the upper flange of the beam 15, as indicated in Fig. 8. The brackets used in this case may have the same over-all dimension since the elevator guideways must be maintained at the same distance apart, but the distance of either guideway from the I beam 15 may vary since the I beams are often not in the same vertical plane. Vertical adjustment of the brackets used in this connection is not required, since the elevator guideways are usually drilled in place and then secured to the brackets by bolts as indicated. In a manner similar to that already described for bracket 4, the brackets shown in this connection permit different positions of the I beams 15, $15^a$ and $15^b$ relatively thereto, while facilitating equally advantageous engagement with the I beam flanges by clamping bolts for any of these positions.

The modifications of brackets shown in Figs. 9 and 10 differ from the modifications shown in Figs. 7 and 8 in that the adjusting portion of the bracket is made of one bar, while the portion used to support the elevator guideways is made from another bar and in this construction as indicated the adjusting portion $16^d$ of the bracket may readily be extended so that the elevator guideway may be brought right up against the flanges of the beam.

The modification of bracket shown in Fig. 13 is similar to that shown in Figs. 7 and 8, with the exception that the clamping bolts are spread somewhat to extend the adjusting slots so that the elevator guideway may be brought right up to the flanges of the I beam and in this modification the bracket is adapted to support but one guideway.

In the modification shown in Fig. 15 the clamping bolt $20^m$ is similar to the clamping bolts 20 shown in Fig. 7, while the clamping bolt $20^n$ is hook-shaped at its lower end to engage the vertical leg of the angle iron, but in other respects the operation of the clamping bolts and the adjustability of the bracket are similar to the corresponding details already described for the other modifications.

In all of the modifications described the adjustment of the bracket is similarly effected and the clamping bolts operate in a similar manner in each case to secure the brackets to the beam for the desired adjustment. The retaining bars operate in each case to retain the clamping bolts in clamping engagement while the brackets are being adjusted.

As a result of the construction described, the brackets required for any work may be constructed at the factory and the work of erecting the brackets and material carried thereby, which in many cases may be assembled upon the brackets at the factory, is reduced to a minimum since the amount of variation in the placing of the beams can be determined and sufficient adjustment provided to cover all cases.

While I have shown my invention in the particular embodiment herein described, I do not limit myself to this particular construction, but desire to claim broadly any equivalent means for accomplishing the same result.

What I claim is:

1. As a means for securing a bracket to a support, bolts extending from the bracket and having offset portions including longitudinal parts for engagement with the side of the support, the bracket being adjustable relatively to such bolts, and means independent of the bracket and the support for co-action with said longitudinal parts of said offset portions to retain said bolts in engagement with the support.

2. As a means for securing a bracket to a support, clamping members extending from the bracket and having offset portions including longitudinal parts for engagement with the side of the support, the bracket being adjustable relatively to such clamping members, and means independent of the bracket and the support for coaction with said longitudinal parts of said offset portions to retain said clamping members in engagement with the support.

3. As a means for securing a bracket to a flanged beam, clamping bolts extending from the bracket and having parts engaging the flanged portion of the beam, the bracket being adjustable relatively to the beam, and means independent of the bracket and the beam for coaction with the bracket proper to retain such clamping bolts against rotation and in engagement with the beam.

4. As a means for securing a bracket to a flanged beam, clamping bolts extending from the bracket and having parts engaging the flanged portion of the beam, the bracket being adjustable relatively to the beam, and means independent of the bracket and the beam for coaction with the bracket proper to retain said clamping bolts against rotation and in engagement with the beam, each of said clamps as a unit being insertible and removable through such bracket.

5. As a means for securing a bracket to a flanged beam, clamping bolts extending from the bracket and having parts engaging the flanged portion of the beam, the bracket being adjustable relatively to the beam, and a bar independent of the bracket and the beam for coaction with the bracket proper to retain such clamping bolts against rotation and in proper position relatively to the beam during the adjustment of the bracket, each of such clamps as a unit being insertible and removable through such bracket and such bar.

6. A bracket adapted for use with a metal beam, bolts extending from the bracket and having offset portions including longitudinal parts for engagement with the side of the beam, the bracket being adjustable relatively to the beam, and a link for co-acting with said offset portions to retain the longitudinal parts thereof in engagement with the beam.

7. A slotted bracket adapted for use with a flanged beam, clamping members extending through such slot into engagement with the flanged portion of the beam, and a separate member for maintaining such clamping members in engagement with the beam, such slot serving to prevent rotation of such clamping members to an inoperative position.

8. A slotted bracket for use with a flanged beam, bolts extending through the bracket and having offset portions including longitudinal parts for engagement with the side of the flanged portion of the beam, and a link connecting said offset portions to retain said longitudinal parts in such engagement.

9. A slotted bracket for use with a flanged beam, bent bolts extending through the bracket and into engagement with the flanged portion of the beam, and a link for retaining the bolts in such engagement, such slotted portion of the bracket permitting adjustment of the bracket relatively to the bolts and such bolts so formed in the bracket as to prevent rotation of the bolts.

In witness whereof, I hereunto subscribe my name this 21 day of April, A. D. 1908.

FRANCIS A. WINSLOW.

Witnesses:
M. D. MILLNER,
CHAS. D. SAXE.